United States Patent [19]

Kunimatsu et al.

[11] 4,364,960

[45] * Dec. 21, 1982

[54] PROCESS FOR THE PRODUCTION OF VINEGAR WITH HIGH ACETIC ACID CONCENTRATION

[75] Inventors: Yoshio Kunimatsu, Handa; Hajime Okumura, Toda; Hiroshi Masai, Handa; Koki Yamada, Handa; Mikio Yamada, Handa, all of Japan

[73] Assignee: Nakano Vinegar Co., Ltd., Tokyo, Japan

[*] Notice: The portion of the term of this patent subsequent to Aug. 4, 1998, has been disclaimed.

[21] Appl. No.: 192,468

[22] Filed: Sep. 30, 1980

[30] Foreign Application Priority Data

Oct. 24, 1979 [JP] Japan .................. 54-136373

[51] Int. Cl.$^3$ .................................................. C12J 1/00
[52] U.S. Cl. ........................................ 426/17; 435/140
[58] Field of Search ................. 426/17; 435/140, 813, 435/818, 819

[56] References Cited

U.S. PATENT DOCUMENTS 3,445,245  5/1969  Ebner .................................. 426/17
3,779,868  12/1973  Nikolaev et al. ..................... 426/17
4,076,844  2/1978  Ebner et al. ......................... 426/17
4,282,257  8/1981  Kunimatsu et al. .................. 426/17

*Primary Examiner*—Raymond N. Jones
*Assistant Examiner*—Elizabeth J. Curtin
*Attorney, Agent, or Firm*—Kane, Dalsimer, Kane, Sullivan and Kurucz

[57] ABSTRACT

A finished vinegar having an acetic acid concentration higher than 20 percent weight by volume is produced by repeating a fermentation cycle wherein a broth is fermented at 27°–32° C. in a 1st submerged fermentation tank by a continuous batch process, and, when the acetic acid concentration of the fermenting broth reaches 12–15 percent weight by volume, the large part of the fermenting broth in the 1st fermentation tank is withdrawn and charged in a 2nd submerged fermentation tank. The 1st fermentation tank is recharged with a mash and the fermentation of the fermenting broth in the 2nd tank is continued under aeration while lowering the temperature of the fermenting broth in such manner that the final fermentation temperature does not fall below 18° C. and the lowering temperature does not become higher than the temperature once lowered.

3 Claims, No Drawings

PROCESS FOR THE PRODUCTION OF VINEGAR WITH HIGH ACETIC ACID CONCENTRATION

BACKGROUND OF THE INVENTION

1. Field of the Invention

This invention relates to a process for the production of vinegar, and more particularly to a process for the production of vinegar having an acetic acid concentration higher than 20 percent weight by volume by a submerged fermentation.

In the specification and claims, unless otherwise indicated, the concentration of alcohol is expressed in volume by volume and the concentration of acetic acid in weight by volume. The sum of percent weight by volume of acetic acid and percent volume by volume of alcohol is called total concentration.

2. Description of the Prior Art

Hitherto, various attempts have been made for obtaining vinegar having a high acetic acid concentration. For example, in the process described in Patent Laying-open No. Sho 52-15,899 (Tokkyo Kōkai Kohō), vinegar having a high acetic acid concentration is obtained by a continuous batch process wherein the manner of alcohol feeding is improved, and also in the processes described in Patent Laying-open Nos. Sho. 52-79,092; Sho 53-41,495 and Sho 53-44,696 (Tokkyo Kōkai Kohō), productions of vinegar having a high acetic acid concentration are attempted by separating a multiplication tank from an acidification tank.

In acetic acid fermentation, the higher the acetic acid concentration becomes, the severer the inhibition of the growth of acetic acid bacteria by acetic acid becomes. The acetic acid being the main product in the acetic acid fermentation. As a result, vinegar having an acetic acid concentration higher than 20 percent weight by volume has never been economically produced and hence there remain various matters to be improved in the acetic acid fermentation process.

Also, in the case of producing vinegar by a submerged fermentation, as the fermentation temperature rises, the production of vinegar having a high acetic acid concentration becomes more difficult. Hromatka et al reports in "Enzymologia", Vol. 15, 337–350 (1953) that in the production of vinegar by a submerged fermentation, the higher the total concentration of a fermenting broth becomes, the lower the optimum temperature thereof becomes. However, the report is on the production of vinegar having an acetic acid concentration up to 12 percent weight by volume and in the reported process, the growth rate of acetic acid bacteria becomes lower due to the low fermentation temperature, which results in greatly reducing the acidification rate and makes the process unpractical from an economical view point.

SUMMARY OF THE INVENTION

The object of this invention is to provide a process for producing vinegar having an acetic acid concentration higher than 20 percent weight by volume with a high efficiency in a submerged fermentation while overcoming the aforesaid difficulties in the conventional processes.

According to the present invention, there is provided a continuous batch process for the production of vinegar in which a broth prepared using alcohol, water, finished vinegar or acetic acid, and nutrients for acetic acid bacteria is charged in a submerged fermentation tank. The broth is innoculated with acetic acid bacteria to initiate the fermentation under aeration. Thereafter the fermentation proceeds and when the acetic acid concentration of the fermenting broth increases sufficiently a portion of the fermenting broth is withdrawn from the tank and a portion is left in the tank. A mash is then re-charged into the tank, and the fermentation is continued under aeration continuing the cycle. The temperature of the fermenting broth is 27°–32° C. and the fermenting broth is withdrawn and the tank re-charged with a mash when the acetic acid concentration of the fermenting broth reaches 12–15 percent weight by volume. The withdrawn fermenting broth is charged in another submerged fermenting tank while maintaining the dissolved oxygen concentration thereof to such an extent as not to reduce the activity of acetic acid bacteria so as to continue the fermentation under aeration alcohol is fed, as required for lowering the temperature of the fermenting broth in such a manner that the final temperature of the fermenting broth does not fall below 18° C. and the lowering temperature does not become higher than the temperature once lowered. The present invention thereby produces a finished vinegar having an acetic acid concentration higher than 20 percent weight by volume is obtained.

DESCRIPTION OF THE PREFERRED EMBODIMENTS

The invention will now be explained below in detail.

Various processes have hitherto been employed for producing vinegar by a submerged fermentation process and in such conventional processes, temperatures of 26°–40° C., usually 28°–32° C. are employed as the fermentation temperatures throughout the whole fermentation period. This temperature range is selected as the optimum temperature condition for producing vinegar by a submerged fermentation process and it is also considered to be important for minimizing the change of environment for acetic acid bacteria.

However, the inventors considered that the phase of acetic acid bacteria used in an acetic acid fermentation could be generally classified into a phase of continuing the multiplication with the acidification (hereinafter, referred to as growth phase) and a phase of stopping the multiplication and continuing the acidification only (hereinafter, referred to as acidification phase), and the employment of a same temperature throughout the two phases was the principal cause making it difficult to obtain a high acetic acid concentration by the conventional processes. This is, as the result of various investigations on paying attention to the properties of acetic acid bacteria, the inventors found that the optimum temperature differed between the growth phase and the acidification phase, and based on this finding, the inventors previously invented a process for producing vinegar wherein conventionally known temperatures, 27°–32° C. were employed in the growth phase, but the temperature of the fermenting broth was lowered to 18°–24° C. in the acidification phase (patent application No. Sho 54-14,216).

Thereafter, the inventors further continued the investigations on a process for producing vinegar using a submerged fermentation process wherein the temperature of a fermenting broth is lowered in the acidification phase and a continuous batch process by a submerged fermentation and as the results thereof, the inventors have succeeded in attaining the process of this invention.

Thus, the results obtained by investigating the acetic acid concentration in case of withdrawing the fermenting broth in a continuous batch process by a submerged fermentation and in case of lowering the temperature of the fermenting broth are explained first by the following experiment.

That is, a broth prepared using alcohol, water, finished vinegar, and nutrients for acetic acid bacteria was charged in a submerged fermentation tank and when the temperature in the tank reached 30° C., the broth was innoculated with acetic acid bacteria to initiate the fermentation. Thereafter, the temperature of the fermenting broth was controlled to about 30° C. by a control thermometer. In this case, the acetic acid concentration was 6.8 percent weight by volume and the alcohol concentration was 3.2 percent volume by volume. Then, when the fermentation proceeded and the acetic acid concentration reached 8.5 percent weight by volume, alcohol having an alcohol concentration of about 50 percent volume by volume was fed and when the acetic acid concentration increased, the temperature of the fermenting broth was lowered to 24° C. by changing the setting of the control thermometer for controlling the temperature of the fermenting broth. In this case, the acetic acid concentration at initiating the lowering of the temperature was changed to various values and the mean acidification rates measured 4 hours before and 4 hours after the acetic acid concentration reached each changed acetic acid concentration were investigated. The results are shown in Table 1.

In addition, mean acidification rates A and B in the table were calculated by the following equations;

$$A = \frac{X - Y}{4} \quad B = \frac{Z - X}{4}$$

wherein;

X: The acetic acid concentration (% weight by volume) when the temperature was changed.

Y: The acetic acid concentration (% weight by volume) measured 4 hours before the temperature was changed.

Z: The acetic acid concentration (% weight by volume) measured 4 hours after the temperature was changed.

TABLE 1

| X (% weight by volume) | A (%/hr.) | B (%/hr.) |
|---|---|---|
| 10.1 | 0.16 | 0.10 |
| 11.2 | 0.18 | 0.11 |
| 12.2 | 0.20 | 0.20 |
| 13.1 | 0.20 | 0.19 |
| 14.1 | 0.17 | 0.16 |
| 15.0 | 0.15 | 0.14 |
| 16.1 | 0.13 | 0.09 |

X: The acetic acid concentration when the temperature was changed.
A: The mean acidification rate during 4 hours before the acetic acid concentration reached the value at the case of changing the temperature.
B: The mean acidification rate during 4 hours after the acetic acid concentration reached the value at the case of changing the temperature.

From the results shown in Table 1, it is understood that the initiation of the lowering of the temperature when the acetic acid concentration of fermenting broth is 12-15 percent weight by volume, preferably 12-13 percent weight by volume gives almost no influences on the acidification rate and hence it is effective for repeating vigorous multiplication of acetic acid bacteria to carry out a so-called continuous batch process performing the withdrawal of a fermenting broth and re-charging a mash when the acetic acid concentration is 12-15 percent weight by volume, preferably 12-13 percent weight by volume.

Thus, it has been found that it is preferred to withdraw the fermenting broth from the fermentation tank in which the continuous batch fermentation process is performed (hereinafter, referred to as multiplication tank) and transfer it to other fermentation tank (hereinafter, referred to as acidification tank) when the acetic acid concentration is 12-15 percent weight by volume and in this case, it is preferred that the alcohol concentration be 3-5 percent volume by volume.

In the acidification tank in which the withdrawn fermenting broth is transferred to continue the fermentation, it is better than the temperature of the fermenting broth directly after transfer is lower than the temperature of the fermenting broth in the multiplication tank, for example, it is preferred that the temperature be about 26°-29° C. according to the temperature of the fermenting broth in the multiplication tank.

The withdrawn fermenting broth was charged to the acidification tank while adding, if necessary, alcohol for supplying the shortage of acetic acid concentration to the fermenting broth and the submerged fermentation was continued. Usually, the acidification rate is reduced with the increase in the acetic acid concentration of the fermenting broth. The reduction in acidification rate may be restrained by lowering the temperature of the fermenting broth, but it has been found that there are problems in the manner of lowering the temperature and the final fermentation temperature of the fermenting broth. Then, the point will be explained by the following experiment.

That is, when the acetic acid concentration of the fermenting broth reached 12 percent weight by volume and the alcohol concentration reached 3 percent volume by volume in a 1st experimental submerged fermentation tank wherein the continuous batch process had been performed while controlling the temperature to 31° C., the fermenting broth was quickly transferred to a 2nd experimental submerged fermentation tank separately prepared and at the same time a control thermometer was operated to control the temperature of the fermenting broth. Also, the feeding of alcohol was initiated to continue the fermentation and while changing the temperature of the fermenting broth with the increase in the acetic acid concentration, the fermentation was stopped when the acetic acid concentration of the fermenting broth reached a desired value. In this case, the temperature was changed to the various values as described in Table 2 and the influences given on the final acetic acid concentration were determined, the results being shown in Table 2.

In addition, the mean acidification rate shown in Table 2 were calculated by the following equation.

$$\text{Mean acidification rate} = \frac{U - V}{T}$$

U: The final acetic acid concentration (% weight by volume).
V: The acetic acid concentration (% weight by volume) directly after charging the fermenting broth.
T: The time (hour) required for the fermentation.

TABLE 2

| Temperature of controlled fermentation broth (°C.) | Mean acidification rate (%/hr) | Final acetic acid concn. (%) |
|---|---|---|
| 32→29→26→23→21 | 0.12 | 20.42 |
| 31→28→25→22→19 | 0.13 | 20.41 |
| 30→27→25→23→20 | 0.13 | 20.53 |
| 29→26→23→20 | 0.15 | 20.78 |
| 28→26→23→20→18 | 0.17 | 20.96 |
| 27→25→23→21→19 | 0.16 | 21.21 |
| 26→24→22→20→18 | 0.17 | 21.54 |
| 30→26→22→18 | 0.18 | 20.98 |
| 28→30→26→24→22 | 0.04 | 18.68 |
| 30→32→29→26→22 | 0.04 | 18.24 |
| 26→24→26→24→20 | 0.05 | 18.86 |
| 27→25→26→23→21 | 0.06 | 18.65 |
| 30→26→22→18→16 | 0.06 | 20.23 |
| 26→24→22→20→18→16 | 0.07 | 20.31 |
| 27→25→23→21→19→17 | 0.05 | 20.16 |
| 27→24→21→18→15 | 0.05 | 20.21 |

As is clear from the experimental results, it is understood that good results are not obtained by changing the temperature of a fermenting broth only; when the temperature is higher than the previous temperature during fermentation, the final acetic acid concentration becomes lower; and when the temperature is lower than 18° C., although the acetic acid concentration reaches over 20 percent weight by volume, the main acidification rate is low and it takes a long period of time to finish the fermentation, which is disadvantageous from the aspect of economical efficiency. Thus, it is also understood that in regard to the temperature condition for a fermenting broth in an acidification tank, the lower limit of the temperature of the fermenting broth is 18° C. and the temperature must be lower than the previous temperature.

As described above, the process of this invention can be performed according to a conventional process for producing vinegar by a submerged fermentation except that the vigorous multiplication of acetic acid bacteria capable of producing a high concentration of acetic acid is repeated by performing a continuous batch fermentation in a submerged fermentation tank. When the acetic acid concentration of the fermenting broth reaches 12-15 percent weight by volume, the fermentation broth containing the bacteria is withdrawn from the tank and at the same time a mash is charged into the tank. The withdrawn broth is charged into another submerged fermentation tank, and after finishing the charge, the temperature of the fermenting broth is lowered in such manner that the final fermentation temperature does not fall below 18° C. and the lowering temperature does not become higher than the temperature once lowered.

In more detail, a broth prepared by using alcohol, water, finished vinegar or acetic acid, and nutrients for acetic acid bacteria (e.g., sake cake extract, yeast extract, inorganic salts, saccharides, and organic acids) is used as the broth in this invention.

As the submerged fermentation tank for performing the fermentation in this invention, a tank wherein a relatively small amount of air (for example, 5–30%/min. to the amount of a fermenting broth in the tank) aerated in a fermenting broth in the tank is sufficiently mixed, such as, for example, an aeration, agitation fermentor, an air lift fermentor, a gas entrained fermentor, etc., is used since both alcohol which is the main raw material and acetic acid which is the main product are volatile.

Furthermore, the innoculation with acetic acid bacteria as well as aging, filtration, pasteurization, etc., for forming vinegar from the finished vinegar after finishing the fermentation can be performed according to conventional manners.

Thus, according to the process of this invention, a finished vinegar having an acetic acid concentration higher than 20 percent weight by volume can be obtained in a short period of time with a high efficiency by a submerged fermentation and also vinegar having an acetic acid concentration higher than 20 percent weight by volume can be produced by aging, filtering, and pasteurizing the finished vinegar according to conventional manners. Moreover, by lowering the temperature of the fermenting broth with the increase of acetic acid concentration in the acidification tank according to this invention, the extreme reduction in acidification rate can be prevented as well as the loss due to evaporation of alcohol which is the main raw material for producing vinegar and acetic acid which is the main product can be suppressed as low as possible. Thus, the process of this invention is very useful for the production of vinegar by a submerged fermentation.

The following example is intended to illustrate this invention but not to limit in any way.

EXAMPLE

In a 25,000 liter submerged fermentation tank equipped therein with an apparatus with aerator and agitator (a 1st tank) was charged 18,000 liters of a broth having an acetic acid concentration of 7% weight by volume and an alcohol concentration of 4% volume by volume prepared by mixing denatured alcohol, water, unfined white vinegar, and nutrients for acetic acid bacteria, such as yeast extract, inorganic salts, saccharides, etc.

Then, the agitator was operated to initiate the agitation and aeration of the broth in the 1st tank. When the temperature of the broth became 31° C., the control thermometer was operated to maintain the temperature of the broth at 31° C. Then, the broth was innoculated with acetic acid bacteria being capable of producing acetic acid up to an acetic acid concentration higher than 15% weight by volume to initiate the fermentation. The fermentation was performed under stirring at a temperature of 31° C. and at an aeration rate of 10%/min. to the amount of the fermenting broth.

When the fermentation proceeded and the acetic acid concentration of the fermenting broth and the alcohol concentration thereof reached 8.5% weight by volume and 2.5% volume by volume, denatured alcohol having an alcohol concentration of about 50% volume by volume was began to be fed to the fermenting broth using a feed pump. When after 18 hours, the addition of about 2,500 liters of the denatured alcohol was finished, the total amount of the fermenting broth in the 1st tank became about 20,500 liters, and the acetic acid concentration of the fermenting broth reached 12.5% weight by volume, about 11,500 liters of the fermenting broth was quickly transferred into a 20,000 liter submerged fermentation tank (2nd tank) by means of a self-priming pump having a pumping power of 1,000 liters/min. without interrupting the aeration.

After initiating the transfer of the fermenting broth, the apparatus of aeration and agitation of the 2nd tank was immediately started to initiate the agitation and aeration of the fermenting broth in the 2nd tank and at the same time the control thermometer was operated at a setting temperature of 29° C. The aeration rate during or after feeding the fermenting broth described above was 10% of the fermenting broth per minute. Simultaneously with the transfer of the fermenting broth the addition of denatured alcohol having an alcohol concentration of about 50% volume by volume was initiated using a feed pump. Thereafter, that is, after 10 hours, 25 hours and 41 hours since the initiation of the fermentation in the 2nd tank, the setting of the control thermometer was changed to 27° C., 24° C. and 21° C. respectively. In this case, the acetic acid concentration of the fermenting broth was 14.5%, 16.6% and 18.7% (weight by volume) respectively. Furthermore, after 50 hours, the acetic acid concentration and the alcohol concentration of the fermenting broth reached 19.6% weight by volume and 1.6% volume by volume respectively and hence the addition of alcohol was stopped. In this case the total volume of the fermenting broth was about 13,700 liters. Then, the fermentation was further continued and when after 62 hours since the initiation of the fermentation in the 2nd tank, the acetic acid concentration and the alcohol concentration of the fermenting broth reached 20.8% weight by volume and 0.3% volume by volume, the operation of the apparatus with aerator and agitator and the control thermometer was stopped and about 13,700 liters of the fermenting broth was withdrawn. The temperature of the fermenting broth directly before stopping the apparatus was 20.8° C.

On the other hand, in the 1st tank from which the fermenting broth had been withdrawn as described above was re-charged 9,000 liters of a broth having an acetic acid concentration of 2.3% weight by volume and an alcohol concentration of 4.0% volume by volume prepared by mixing alcohol, water, a finished vinegar, and nutrients for acetic acid bacteria. After the re-charge of the broth, the acetic acid concentration and the alcohol concentration of the fermenting broth in the 1st tank reached 7.4% weight by volume and 3.6% volume by volume respectively. Thereafter, the fermentation in the 1st tank was performed under the condition as above, when the acetic acid concentration and the alcohol concentration of the fermenting broth in the 1st tank reached 8.5% weight by volume and 2.5% volume by volume respectively, denatured alcohol was added as described above, and when the acetic acid concentration of the fermenting broth reached 12.5% weight by volume, the fermenting broth was withdrawn from the 1st tank and transferred into the 2nd tank, and a broth was re-charged in the 1st tank as described above. Thus, the continuous batch process continued in the 1st tank and the batch process in the 2nd tank repeatedly as described above.

By further repeating 10 times the aforesaid fermenting procedure wherein the fermenting broth in the 1st tank was transferred in the 2nd tank to continue the fermentation at low temperatures as described above, a finished vinegar having a mean acetic acid concentration of 20.6% weight by volume was obtained.

By aging, filtering and pasteurizing the finished vinegar by conventional manners, vinegar having a high acetic acid concentration was obtained.

What is claimed is:

1. A continuous batch process for the production of vinegar comprising:
   (a) preparing a broth of alcohol, water, finished vinegar or acetic acid and nutrients for acetic acid bacteria;
   (b) charging the broth into a first submerged fermentation tank;
   (c) innoculating the broth with acetic acid bacteria to initiate fermentation under aeration;
   (d) withdrawing a portion of the fermenting broth after fermentation has proceeded at a temperature between 27° and 32° C., at the point of time when the acetic acid concentration of the fermenting broth has increased to between 12 and 15% weight by volume and charging the withdrawn portion into another submerged fermenting tank while maintaining the dissolved oxygen concentration of the withdrawn portion at such an extent so as not to reduce the activity of acetic acid bacteria;
   (e) recharging said first fermentation tank with a mash; and
   (f) continuing fermentation under aeration in said another tank while lowering the temperature of fermenting broth from a temperature between 27° and 32° C. in said another tank in such a manner that any lowered temperature of fermenting broth may not become higher than the temperature lowered antecedently thereto and that the final temperature of the fermenting broth may not fall below 18° C.

2. The process in accordance with claim 1 comprising the further step of feeding alcohol to said another fermentation tank to obtain a finished vinegar therein having an acetic acid concentration of not lower than 20% weight by volume.

3. The process in accordance with claims 1 or 2 comprising the further steps of aging, and pasteurizing the finished vinegar.

* * * * *